Figure 1:
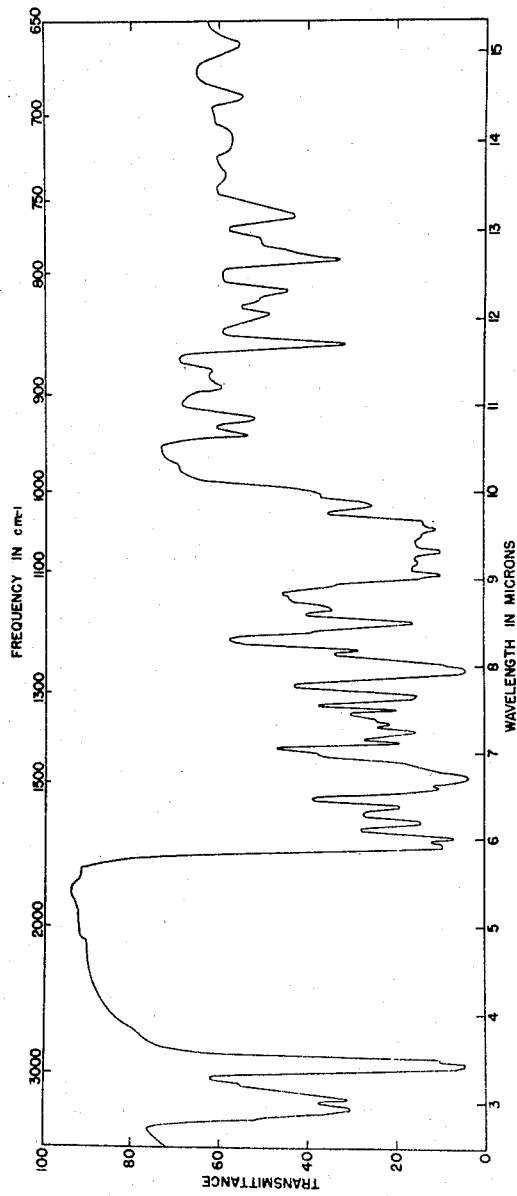

BIOAUTOGRAPH OF PAPER CHROMATOGRAM

United States Patent Office 2,909,517
Patented Oct. 20, 1959

2,909,517

AMICETIN AND ITS PRODUCTION

Clarence De Boer and Jack W. Hinman, Kalamazoo, Mich., assignors to The Upjohn Company, Kalamazoo, Mich., a corporation of Michigan Application July 23, 1951, Serial No. 238,072

15 Claims. (Cl. 260—211.5)

This invention relates to the cultivation under controlled conditions of the hitherto undescribed organism *Streptomyces vinaceus-drappus*, to methods for the recovery, and concentration from crude solutions including the fermentation broths of the antibiotic substances produced by said cultivation and to the substances and their salts obtained thereby.

This invention more specifically relates to a new and useful antibiotic, called amicetin, its salts and to methods for their preparation, concentration and isolation. This antibiotic has not yet been proven useful in human therapy.

The hitherto undescribed organism which produces the new antibiotic substances of this invention was isolated from a Kalamazoo, Michigan, soil and has been named *Streptomyces vinaceus-drappus*. The specific name, *vinaceus-drappus*, was chosen to refer to the drab wine color (according to Ridgeway's color standards) of the aerial mycelium and spores of the organism when cultured on a variety of media as set forth below. A culture of the living organism has been deposited with the Northern Regional Research Laboratory of the U.S. Department of Agriculture where it has been designated as *Streptomyces vinaceus-drappus*, strain D-13 NRRL 2363.

A careful study of the morphology and physiology of *S. vinaceus-drappus* shows it to be distinctly different from any previously described species. The description of this organism according to Bergey's "Manual of Determinative Bacteriology," sixth edition, pages 929–933, is set forth hereinafter, the reported colors being based on Ridgeway's "Color Standards and Nomenclature." All seeding was done with a spore suspension and the tubes were incubated between 24 and 28 degrees centigrade. Readings were made on the 4th, 7th, 15th and 22nd days.

*S. vinaceus-drappus* produces a long filamentous mycelium, which branches profusely, and spherical conidia in sinistrorse spiral chains. The spirals occur singly or in clusters and measure 15–20 microns in length by 3–5 microns in width. Most of the spirals consist of 3 to 5 volutions. The hyphae are approximately one micron in width while the conidia are between 1.5 and 2.0 microns in diameter. Two strains of *S. vinaceus-drappus* have been isolated, identified and found to produce amicetin when cultivated under controlled conditions. These strains have been designated as strain D–12 and strain D–13. Strain D–13 reduces litmus milk at a slower rate than strain D–12; the spores of strain D–13 change from a cream color to vinaceous drab, while the spores of strain D–12 are vinaceous drab almost from the beginning of visible growth. When grown on sweet-potato, strain D–13 produces a smooth growth film in contrast to the warty growth layer of strain D–12. No other differences have been observed between these strains.

Although the above described organism, *S. vinaceus-drappus*, is similar in some respects to *Streptomyces lavendulae*, the two are readily distinguished not only by their difference in color (lavender as compared with vinaceous-drab), but also by differences in their cultural characteristics. To highlight these differences, characteristics for *S. vinaceus-drappus* given in the preceding table are directly compared with the same characteristic reported for *S. lavendulae*.

| Cultural characteristic | S. lavendulae | S. vinaceus-drappus |
|---|---|---|
| (1) Water soluble pigment | Yes—brown | None. |
| (2) Gelatin | Colored—cream to brown. | Color—ivory. |
| (3) Potato slant | Cream colored; light growth. | Vinaceous-drab; heavy growth. |
| (4) Conidia | Oval | Spherical. |

For the production of amicetin, we do not wish to limit ourselves to the use of *S. vinaceus-drappus* var. D–12 and D–13 or to organisms fully answering the foregoing descriptions which are given merely for illustrative purposes. We wish especially to include the use of microorganisms which are mutants produced from *S. vinaceus-drappus* by mutating agents such as X-radiation, ultraviolet light, high speed electrons, nitrogen mustards, and the like.

Amicetin is particularly effective against Mycobacteria. It also inhibits the growth of other Gram-positive bacteria such as *Staphylococcus aureus* and *Bacillus subtilis*, but unlike most of the presently known antibiotics produced

STREPTOMYCES VINACEUS-DRAPPUS SP. NOV.

| Medium | Amount of growth | Color | | Remarks |
|---|---|---|---|---|
| | | Aerial mycelium and spores | Soluble pigment | |
| Casein starch agar | Profuse | Light vinaceous drab | None | Colonies flat, smooth, entire. Partial starch hydrolysis. |
| Czapek's-Dox agar | Moderate | Pallid vinaceous drab | do | Cinnamon buff reverse. |
| Irish potato | Heavy | Pale vinaceous drab | do | Rugose surface. Exceptional growth and sporulation. |
| Sweet potato | do | Light vinaceous drab | do | Warty surface. Excellent growth and good sporulation. |
| Nutrient agar | Light | White | do | Chamois reverse. |
| Dextrous agar | Heavy | Quaker drab | do | Blackish-brown (2) reverse. |
| Tyrosine agar | Trace | No sporulation | do | Negative tyrosinase reaction. |
| Calcium malate | Moderate | Pale vinaceous drab | do | |
| Cellulose broth | Light | Pallid vinaceous drab | do | No decomposition of cellulose. |
| Starch agar | Moderate | White | do | Partial hydrolysis. Honey yellow reverse. |
| Nutrient broth | Slight | White-pallid vinaceous drab | do | Vegetative submerged growth. |
| Dextrose broth | Moderate | White | do | Do. |
| Nitrate broth | do | do | do | Reduces nitrates to nitrites. |
| Litmus milk | Light | Pallid vinaceous drab | do | Alkaline reaction, ring-like growth at surface. Gradual reduction, no visible coagulation. |
| Gelatin | do | Ivory | do | Slow liquefaction, pellicle growth. | by other Streptomyces, amicetin does not have a wide Gram-negative spectrum as is shown below:

WEIGHT OF CRYSTALLINE AMICETIN HYDRATE CAUSING COMPLETE INHIBITION OF TEST ORGANISM

| Species | Mcg./ml. |
| --- | --- |
| M. tuberculosis (607) ATCC | 1.3 |
| M. tuberculosis H37Rv | 0.2-1.0 |
| S. aureus (F.D.A.-209) | 2 |
| B. subtilis (Ill.) | 4 |
| K. pneumoniae (PCI-602) FDA | >20 |
| P. vulgaris (8427) ATCC | 20 |
| Ps. aeruginosa (9027) ATCC | >20 |
| E. coli (26) ATCC | >20 |
| PCI$_3$ | >20 |
| B. cereus (9139) ATCC | >20 |
| S. schottmuellerii (9149) ATCC | >20 |

The above indicated potency of amicetin hydrate was determined by preparing a nutrient broth consisting of 0.75 percent of Difco's Bacto-Peptone and 0.25 percent of Difco's yeast extract adjusted to pH 7.25 with sodium hydroxide solution, placing the broth in sterile tubes and adding varying amounts of amicetin thereto. Each tube was inoculated with one drop per tube of a 1 to 100 dilution of a 24-hour culture suspension of the test organism grown at 37 degrees centigrade. Observations were made as to the presence or absence of growth after 16 hours of stationary incubation at 37 degrees centigrade with the exception of Mycobacteria. When M. tuberculosis (607) was the test organism, growth observations were made after 40 hours of incubation; with M. tuberculosis H37Rv, the final reading was made after 21 days of incubation.

Figure 3:
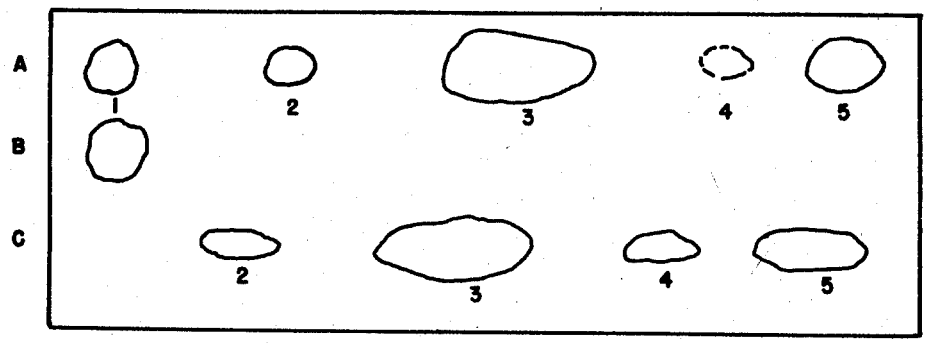

The movement of the antibiotic substances produced by the fermentation of S. vinaceus-drappus on paper chromatography according to the method of Peterson and Reineke J. Am. Chem. Soc. 72, 3598 (1950) using n-butanol saturated with water is shown in Figure 3. The antibiotic materials present in the Streptomyces vinaceus-drappus culture liquid are detected by plating the paper chromatogram on an agar tray seeded with Mycobacterium avium. After incubation at a temperature of 37 degrees centigrade for a sixteen to twenty hour period, zones of inhibition appear on the agar plate as shown in Figure 3. The zones of inhibition in Chromatogram A, Figure 3, indicate that under the fermentation conditions described in Example 2 of the application, several antibiotics are produced. Inhibition zone No. 3 is caused by amicetin; zone 4, by amicetin A; zone 2, by amicetin B; zone 5, by amicetin C; and zone 1, by the known antibiotic streptolin.

Chromatograms A, B and C are obtained on the same strip of filter paper using wet n-butanol as a solvent. When a sample of the filtered S. vinaceus-drappus culture liquid grown on the medium used in Example 3 is chromatogrammed, Chromatogram A is obtained. After extraction of the S. vinaceus-drappus culture liquid with n-butanol and following the development of the papergram described above, Chromatogram B is obtained indicating the presence of only one antibiotic, the butanol-insoluble streptolin, in the butanol-spent liquor. When a sample of the butanol-extracted preparation is chromatogrammed, Chromatogram C is obtained. The zones of inhibition show that this material contains amicetin (zone No. 3) in addition to three other butanol-extractable antibiotics, amicetin A, amicetin B, and amicetin C.

It has been found that the Rf value of amicetin (the ratio of the movement of the liquid front to the movement of the antibiotic) is about 0.55 when n-butanol saturated with water is the developing agent and the Rf value is about 0.75 when a mixture of n-butanol, acetic acid and water in a ratio of 2:1:1 is used as the developing solvent. These Rf values are distinctly different when direct comparison is made with other known and described antibiotic substances.

In order that the activity of culture filtrates, extraction fractions, crude, purified or crystalline preparations of amicetin can be easily and routinely evaluated, an agar plate assay has been employed using M. avium (7992) as the test organism and pure streptomycin sulfate as the standard. An M. avium unit of activity (or more simply a unit of activity) as herein used is by definition the equivalent of one microgram of pure streptomycin free base. The assay procedure is based on that of Loo et al., J. Bact. 50, 701 (1945). The agar medium consists of Trypticase Soy Broth, 30 grams; Bacto agar, 20 grams; beef extract, 3.0 grams; Tween 80, 0.1 milliliter and sufficient water to make one liter. The test solution is applied to one-quarter inch filter paper disks (Whatman) and the plates are incubated at 37 degrees centigrade for sixteen to eighteen hours. The range of the assay curve is from 6.25 units per milliliter to 100 units per milliliter.

This invention embraces a process for growing S. vinaceus-drappus, a new and hitherto undescribed species of microorganism, under controlled conditions, which preferably include a temperature of about twenty-four to about twenty-eight degrees centigrade, submerged fermentation with suitable agitation and aeration using media consisting of a carbohydrate source such as glycerol, starch and sugars; a source of organic nitrogen such as soybean meal, rolled oats, corn steep liquor and mixtures thereof; a source of growth substances such as yeast, distiller's solubles, fermentation solubles and the like; mineral salts such as ammonium nitrate, potassium nitrate, sodium chloride, magnesium sulfate and the like; a buffering agent having reserve alkalinity such as calcium carbonate, sodium dihydrogen phosphate and the like and, when commercial scale fermentations are carried out, adding a non-toxic defoaming agent such as an animal or vegetable oil. When the growth of the organism has produced a satisfactory quantity of antibiotic substances (as indicated for example by the M. avium plate assay), the mycelium is separated from the antibiotic containing culture fluid. The antibiotic substances are then separated from the culture fluid by suitable solvent extraction or adsorption and elution procedures as are more fully described and illustrated hereinafter. A specific substance thus obtained, amicetin, possesses unique and valuable properties and characteristics which distinguish it from known and previously described antibiotic substances.

Inoculum suitable for use with either shaken flasks, pilot or commercial sized submerged inoculum tanks can be obtained by employing a growth from casein-starch-agar slants. This medium can also be used to maintain, by suitable transfers, virile antibiotic producing cultures of the organism. This growth is used to inoculate either shaken flasks or submerged inoculum tanks; or alternatively, the inoculum tanks are inoculated from the shaken flasks. In general it has been found that growth of the organism in shaken flasks reaches its maximum in from three to five days, and in submerged inoculum tanks in from two to five days, although shorter or longer periods of growth of the inoculum can be used. When shaken flasks or five gallon bottles are used for antibiotic production, a suitable quantity of inoculum is added under sterile conditions from a pipette or other suitable means while inoculation of pilot or commercial tanks is preferably done by forcing the contents of an inoculum tank containing S. vinaceus-drappus into the fermenter under completely aseptic conditions. The fermentation is allowed to continue for a period of from about three to about five days. Aerobic conditions are maintained in the fermentation vessels by forcing in air through a sparger at a suitable rate, the actual rate being dependent on the size of the vessel, the type of agitation and the medium employed, with about one-fourth to one and one-half volume of air per volume of media per minute being preferred. Should difficulty be encountered from foaming during the fermentation, non-toxic antifoaming agents such as animal or vegetable oils and the like can be added in such amounts and at such times as are necessary for suitable diminution of the foam. Throughout the fermentation period the broth is agitated, the degree of agitation being dependent upon the general engineering design of the fermentation vessel and the type of agitator employed it being appreciated that commercial size units are constructed for general antibiotic production and are usually not designed for the production of a specific material. For the production of antibiotic substances by the fermentation of S. vinaceous-drappus, in particular amicetin, the temperature of the agitated broth is maintained between 20 and 30 degrees centigrade, preferably between 24 and 28 degrees centigrade.

From the fermentation broth, obtained as described above, the antibiotic substances contained therein can be recovered by a variety of different procedures. The first step in recovering these substances preferably involves the separation of the mycelium from the culture fluid. More specifically, when amicetin is to be recovered from the fermentation broth, the separation of the mycelium is best carried out by filtering the broth at its normal pH at the end of the fermentation period, usually at a pH between about 7.0 and about 8.0, with or without the assistance of a diatomaceous earth filter aid, such as the commercially available Dicalite 4200 or Supercel.

Amicetin can be recovered from the filtered fermentation broth by adsorption on an adsorbing agent such as activated charcoal or suitable ion-exchange resins. When activated charcoal is the adsorbing agent, the adsorption can be carried out at the normal pH of the fermentation broth (pH 7-8) and at room temperatures. The antibiotic can be eluted from charcoal with aqueous water miscible alcohols and ketones acidified to a pH of about 2.0 with a mineral acid, a ten percent aqueous acetone solution being preferred. The adsorption and elution can be carried out batchwise or by flowing chromatographic procedures. On removal of the antibiotic from the absorbant, solid crude amicetin can be recovered from the clarified eluate by adjusting the pH to about 7-8 and drying from the frozen state under reduced pressure. Aqueous acidified water miscible alcohols and ketones as well as suitable salt solutions and the like can be used to elute amicetin from cationic ion-exchange resins.

Alternatively, amicetin can be extracted directly and selectively from the filtered fermentation broth at a pH of 7 or higher into certain neutral, water immiscible alcohols, ketones, halogenated hydrocarbons or esters such as the butanols, pentanols, diethyl ketone, methylene chloride, ethylacetate, amylacetate and the like with butanol being preferred. After extraction of amicetin into the water immiscible solvent, the solution is concentrated under reduced pressure to a small fraction of its original volume and the concentrated solution thus obtained extracted with dilute aqueous acid. Upon separation of the aqueous acid phase and adjusting the pH to about pH 7-9 with alkali, amicetin separates as a solid precipitate. An alternative procedure which can be used to isolate the antibiotic from the solvent extract is the azeotropic distillation of the solvent, adding water as necessary, until a small aqueous volume is obtained which can be frozen and dried. A further modification of this azeotropic distillation procedure involves seeding the aqueous concentrate thus obtained with a crystal of the antibiotic which causes the direct crystallization of amicetin from the aqueous solution. The crystalline product obtained in this manner has been found to have a potency of 600-900 M. avium units. Such a product is suitable for some uses or it may be converted to a pure product by further crystallization from water, methanol and other solvents as is described in greater detail hereinafter.

Crystalline amicetin can be obtained from crude amorphous preparations assaying 150-400 M. avium units per milligram by extracting a water solution of such material with butanol and the like at pH 7.5-9, separating the organic solvent phase, which is in turn extracted with dilute acid, the antibiotic being transferred to the aqueous-acid phase. Adjusting the pH of this solution to pH 7-9 and cooling, causes precipitation of amicetin of improved purity in a crystalline form. An alternative procedure for obtaining crystalline amicetin of high purity from amorphous material is the counter current distribution technique of Craig, J. Biol. Chem., 155, 519 (1944). The amorphous antibiotic is distributed between water and methylene chloride, or between water and butanol. The contents of selected tubes are evaporated to dryness and upon crystallization of the residues from water or dilute methanol, amicetin of high quality is obtained.

Amicetin is a weakly basic compound. Titration studies indicate that the crystalline material has a $pK_a$ in the neighborhood of 7. The hydrated crystalline free base is soluble in distilled water to the extent of only about 0.1 percent, but is readily soluble in acid solutions. The crystalline hydrochloride may be obtained by dissolving the free base in dilute hydrochloric acid, concentrating the solution to a small volume under reduced pressure and precipitating the crystalline hydrochloride by careful addition of acetone or a mixture of methanol and acetone. As an alternative modification, the aqueous solution of the hydrochloride may be freeze-dried and the resulting amorphous solid crystallized from methanol and acetone. So obtained, the crystalline hydrochloride is in the form of a hydrate. Other salts such as the acetate, sulfate and the like can be obtained in a similar manner.

Crystallization of amicetin from its aqueous solutions or solutions containing some water, in general, yields a hydrated crystalline material. The anhydrous material may be prepared readily by drying the hydrated forms at slightly elevated temperatures in vacuo or by crystallization from a substantially anhydrous solvent such as absolute methanol.

The most commonly encountered crystalline form of amicetin separates from aqueous or predominately aqueous solutions as very tiny needles or clusters of needles. When collected on a filter, these crystals pack tightly together to form a glossy mat. After drying in a vacuum desiccator over anhydrous magnesium perchlorate at room temperature, the hydrated crystals melt over a rang from 160-170 degrees centigrade depending upon the size of the crystals and the rate of heating. The specific rotation of the hydrated crystals in 3A alcohol is $[\alpha]_D^{23.5} = +143$ degrees (1.01 percent in 3A alcohol). This value does not change with time but remains constant.

When the ultraviolet absorption spectrum of crystalline amicetin hydrate is determined in aqueous solution using a Beckman quartz spectrophotometer, Model DU, or a Cary recording spectrophotometer, a single maximum of $$E_{1\ cm.}^{1\%} = 400 \text{ at } 304 \text{ m}\mu$$

is observed. A minimum is observed at about 235 m$\mu$ of $$E_{1\ cm.}^{1\%} = 148$$

The preparation of the crystalline hydrochloride of amicetin has been described herein. This material, like the free base, may be obtained either as the hydrated or anhydrous form. The hydrated form, which is most commonly encountered, melts at 190-192 degrees centigrade and has a specific rotation of $[\alpha]_D^{24.5} = +117$ degrees (c, 0.4 in 3A alcohol).

Anhydrous crystals of amicetin free base may be obtained by recrystallization of the hydrated crystals from essentially anhydrous solvents such as absolute methanol, or by drying the hydrated product in vacuo to remove the water of crystallization. The anhydrous antibiotic may then be recrystallized from methanol substantially free from water. When so prepared, the anhydrous crystals of amicetin are small dense crystals which melt at 243–244 degrees centigrade. The ultraviolet absorption spectrum is essentially the same as that for the hydrated crystals, allowance being made for the water of hydration. When the ultraviolet absorption spectrum of a sample of the anhydrous crystalline amicetin is determined with the Cary recording spectrophotometer in dilute fifty percent aqueous ethanol, a single maximum is observed at $$306 \text{ m}\mu \text{ } E^{1\%}_{1\text{ cm.}} = 512$$

When the ultraviolet absorption spectrum of the same material was determined with the sample dissolved in fifty percent ethanol plus fifty percent 0.1 N sodium hydroxide, the following maxima were observed:

$$E^{1\%}_{1\text{ cm.}} \text{ at } 272 \text{ m}\mu = 283$$

$$E^{1\%}_{1\text{ cm.}} \text{ at } 325 \text{ m}\mu = 412$$

When the spectrum was determined using a mixture of fifty percent ethanol and fifty percent 0.1 N hydrochloric acid, a single maximum of $$E^{1\%}_{1\text{ cm.}} = 451$$

was observed at 304 m$\mu$.

A suspension of anhydrous crystalline amicetin mulled in liquid petrolatum exhibits many characteristic absorption bands in the infrared, among which are the following expressed in reciprocal centimeters: 3405, 3230, 1684, 1614, 1567, 1522, 1491, 1252, 1176, 1104, 1072, 1046, 1019, 855, 790, 758, and 692. The infrared absorption spectrum of this liquid petrolatum mull within the region of wave numbers between about 3500 and about 650 cm.$^{-1}$ is shown in Figure 1 of the accompanying drawings.

The infrared absorption spectrum of a liquid petrolatum mull of amicetin shows individual bands at about 3405 and 3230 cm.$^{-1}$ which are characteristic of O—H and N—H groups. The bands at about 2900, 1380 and 1460 cm.$^{-1}$ are due to the liquid petrolatum. The bands at 1684, 1654, 1614, 1567, 1522 and 1491 cm.$^{-1}$ are characteristic of a monosubstituted amide carbonyl, conjugated carbonyl or a system of conjugated carbon to carbon double bonds. At about 1252, 1176, 1104, 1072, and 1046 cm.$^{-1}$ there occur bands which may be due to C—O or C—O—C linkages. The bands at 692, 758, and 790 cm.$^{-1}$ indicate a multiple-substituted aromatic nucleus.

Figure 2:
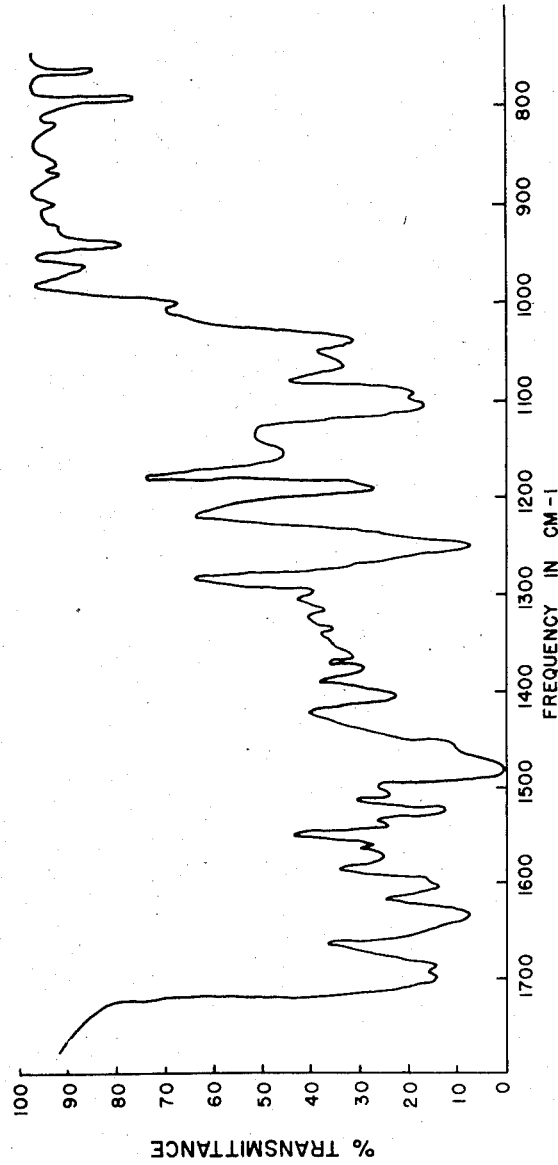

The infrared absorption spectrum of a liquid petrolatum mull of crystalline amicetin hydrochloride hydrate likewise shows many characteristic bands, among which are the following: 3290, 1700, 1685, 1637, 1606, 1523, 1480, 1251, 1190, 1105, 1090, 1063, 1037, 938, 791, and 760 cm.$^{-1}$. This infrared spectrum of the hydrochloride of amicetin within the limits of wave numbers 1750 and 700 cm.$^{-1}$, is shown in Figure 2.

The infrared absorption spectrum of a suspension of crystalline amicetin hydrochloride hydrate in liquid petrolatum shows general absorption in the region 3600 to 2500 cm.$^{-1}$ with a distinct band appearing at about 3290 cm.$^{-1}$. The bands at about 2900, 1380, and 1460 are the result of the infrared absorption of the liquid petrolatum. The bands which occur at 1700, 1685, 1606, 1523 and 1480 cm.$^{-1}$ are characteristic of a monosubstituted amide carbonyl, conjugated carbonyl, or a system of conjugated carbon to carbon double bonds. The bands occurring at 1251, 1190, 1105, 1090, 1063 and 1037 cm.$^{-1}$ are probably associated with C—O or C—O—C linkages. There are also bands at 760 and 791 cm.$^{-1}$ which are probably associated with a multiple-substituted aromatic nucleus. Additional bands of unascertained origin occur at various positions throughout the spectrum.

The above properties clearly show that amicetin is different from any of the known and previously characterized antibiotics.

The following examples are given to illustrate how amicetin may be formed, recovered, concentrated, purified, crystallized and identified. The examples are merely illustrative and are not to be construed as limiting our invention. Strains of *Streptomyces vinaceus-drappus* designated as D–12 and D–13 were used in producing amicetin in the following examples.

*Example I.—Formation of amicetin*

Five hundred milliliter Erlenmeyer flasks were filled each with 100 milliliters of a medium of peptone-glucose-yeast extract seed medium and autoclaved at 120 degrees centigrade for 15 minutes. After cooling, each flask was inoculated with a loopful of *S. vinaceus-drappus* spore suspension obtained from a casein-starch agar slant and the inoculate incubated at 24 degrees centigrade on a reciprocating shaker at 90 four-inch strokes per minute for 48 hours.

Erlenmeyer flasks each containing 100 milliliters of the following medium:

| | Grams |
|---|---|
| Cerelose | 25 |
| Yeast (2019) | 2.5 |
| Ammonium sulfate | 5 |
| Calcium carbonate | 8 |
| Potassium chloride | 4 |
| Potassium dihydrogen phosphate | 0.4 |
| Soybean meal | 7 |
| Distilled water to give 1000 milliliters, q. s. | | were sterilized for 20 minutes at 120 degrees centigrade, cooled and each inoculated with 5.0 milliliters of the 48 hour vegetative inoculum. The flasks were then incubated at 24 degrees centigrade on the reciprocating shaker. At the end of five days, the pH of the culture filtrate was 6.95 and assayed 520 *M. avium* units per milliliter.

*Example II.—Formation and recovery of amicetin*

Medium:

| | Grams |
|---|---|
| Brown sugar | 10 |
| Glycerol | 5 |
| Lactose | 5 |
| Dextrin | 5 |
| Yeast (2019) | 2 |
| Curbay B.G. | 2 |
| Distiller's solubles (SVP) | 5 |
| Ammonium nitrate | 2 |
| Corn steep liquor | 2 |
| Calcium carbonate | 4 |
| Sodium chloride | 5 |
| Distilled water to 1000 milliliters. | |

One hundred-milliliter portions of the above medium were added to a series of 500 milliliter Erlenmeyer flasks and the flasks sterilized at 120 degrees centigrade for 20 minutes. After cooling, each flask was inoculated with 5.0 milliliters of a 48-hour vegetative seed of *S. vinaceus-drappus* prepared as described in Example I. After incubating for 5 days at 24 degrees centigrade on a reciprocating shaker, the broth was filtered through a pad of Supercel to remove the mycelium, yielding 1250 milliliters of dark brown filtrate having a pH of 7.5 and assaying about 470 *M. avium* units per milliliter. Without changing the pH, 1000 milliliters of the filtered broth was extracted with two 500-milliliter portion of n-butanol. The combined butanol extract was clarified by filtration through a pad of Supercel and concentrated in vacuo to dryness. The residue left from the distillation was dissolved in 10 milliliters of water and freeze-dried to yield 1.232 grams of yellow solid which assayed 335 *M. avium* units per milligram.

When the broth was extracted with pentanol, diethyl-ketone, ethylacetate, amylacetate, or methylene chloride, amicetin was obtained in the organic solvent layer.

Example III.—Formation of amicetin

Medium:                                          Grams
- Dextrin _____ 20
- Oatmeal (Gerber's strained) _____ 20
- Potassium dihydrogen phosphate _____ 0.2
- Ammonium sulfate _____ 10
- Potassium chloride _____ 4
- Calcium carbonate _____ 16
- Distilled water to 1000 milliliters.

One hundred-milliliter portions of the above medium were added to a series of 500 milliliter Erlenmeyer flasks and the flasks were autoclaved for 20 minutes at 120 degrees centigrade. Five milliliters of a 48-hour vegetative seed of *S. vinaceus-drappus*, prepared as previously described, was aseptically added to each of the cooled flasks which were then incubated at 24 degrees centigrade on a reciprocating shaker, and harvested on the fourth day to yield a culture filtrate (pH 7.0) assaying 610 *M. avium* units per milliliter.

Example IV.—Formation and recovery of amicetin

One shaken flask of inoculum of *S. vinaceus-drappus*, prepared according to the method described previously, was used to inoculate a five gallon seed fermenter containing twelve liters of beef extract-peptone medium having the following composition:

Grams
- Glucose _____ 10
- Peptone (Difco) _____ 6
- Beef extract (Difco) _____ 10
- Sodium chloride _____ 6
- Tap water to 1000 milliliters.

Air was supplied at the rate of six liters per minute and the agitation ran at 280 r.p.m.

After 48 hours of incubation at 24 degrees centigrade, the contents of the five gallon fermenter was used to inoculate a 100 gallon tank containing 240 liters of the medium described in Example II. Prior to inoculation, the tank and its contents were sterilized by heating for 20 minutes at 120 degrees centigrade. During the fermentation, the temperature was maintained at 26 degrees centigrade, air was supplied and agitation was provided. After 88 hours the tank was harvested. The pH was 7.9 and the broth was found to have a potency of 153 *M. avium* units per milliliter.

The broth was filtered to remove the mycelium and the filtered broth extracted, with one-fourth volume of n-butanol without pH adjustment, using a Podbielniak extractor. The butanol extract was concentrated to an aqueous solution by azeotropic distillation and the aqueous solution was freeze-dried to yield 56 grams of dark powder which assayed approximately 200 *M. avium* units per milligram.

Fifty grams of the crude preparation was stirred with 100 milliliters of water. The mixture was adjusted to pH 9 and extracted with four 200-milliliter portions of water-saturated n-butanol. The combined butanol extract was clarified by filtration through a Supercel pad and extracted with five 100-milliliter portions of 0.1 N hydrochloric acid. The combined aqueous extract was decolorized using 7.5 grams of Darco G-60 and the solution was adjusted to pH 8.6 by addition of sodium hydroxide solution. After cooling in the refrigerator for fifteen hours, the first crop of crystals was collected. When washed with water and dried, these weighed 4.34 grams. The mother liquor was concentrated to about 75 milliliters and on cooling, a second crop of crystals amounting to 2.52 grams was obtained. The crystals were nearly white in color and were found to have a potency of 900 *M. avium* units per milligram.

Example V.—Recovery of amicetin from broth by adsorption

One hundred milliliters of amicetin broth which had been filtered through a pad of Supercel was stirred with 2.0 grams of activated charcoal, Darco G-60, for one hour at room temperature. The mixture was filtered and the carbon cake reserved for eluting. Assays showed that the filtered broth contained about 400 units per milliliter before treatment with carbon and about 50 units per milliliter after carbon treatment. For eluting, the Darco cake was suspended in 50 milliliters of 10 percent acetone and the pH was adjusted to 2.0 with 6 N hydrochloric acid. After stirring for twenty minutes, the mixture was filtered. The filtrate was neutralized and freeze-dried to yield 158 milligrams of an off-white powder which assayed 70 *M. avium* units per milligram.

Similar concentration of activity is obtained using, in a like manner, the cationic ion-exchange resin IRC-50.

Example VI.—Preparation of crystalline amicetin by counter-current distribution Five hundred milligrams of an amorphous preparation prepared as in Example II and assaying 420 units per milligram was dissolved in fifty milliliters of water. The solution was subjected to a counter-current distribution with five separatory funnels, using equal volumes of water and methylene chloride. The methylene chloride was evaporated from each tube and the resulting aqueous solution checked for potency and solids. Funnel number 1 was selected and freeze-dried to yield 69 milligrams of white powder. A portion of this (39 milligrams) was dissolved in 5.5 milliliters of water by stirring and warming to 55 degrees centigrade. The solution was filtered and, on cooling, the filtrate deposited fine colorless needles which, after drying, amounted to 13.3 milligrams. This crystalline product was found to assay 1240 *M. avium* units per milligram.

Example VII.—Recovery of amicetin from broth by extraction and crystallization from the extract Two hundred and ten liters of amicetin fermentation broth was filtered without the use of a filter aid. The filtrate was extracted at pH 7.2, using n-butanol in a 5:1 broth to solvent ratio, in a Podbielniak extractor. The butanol extract was distilled azeotropically in vacuo to a volume of 1800 milliliters. The solution was seeded with crystalline amicetin and after several days of refrigeration, 8.74 grams of crude crystals were obtained in two crops. Substantially pure crystalline amicetin was obtained by recrystallization of the crude crystals from dilute aqueous methanol. The recrystallized material assayed 1020 *M. avium* units per milligram. A sample of this crystalline amicetin hydrate gave the following elementary analysis:

Percent
- Carbon _____ 56.91
- Hydrogen _____ 6.97
- Nitrogen _____ 13.51
- Oxygen (by difference) _____ 22.61

Example VIII.—Preparation of anhydrous crystalline amicetin

A sample of 4.88 grams of the hydrated crystals of amicetin (from Example VII) were recrystallized twice from methanol and water to yield 3.7 grams of the purified hydrate. The hydrated crystals were stirred in 25–30 milliliters of anhydrous methanol at about 35 degrees centigrade until nearly all of the solid dissolved. The walls of the flask were scratched with a glass rod and the anhydrous crystals (2.34 grams) separated. The dense granular crystals melted at 238–240 degrees centigrade on a Kofler microhotstage and assayed 1025 *M. avium* units per milligram. On heating at 60 degrees centigrade in high vacuum over anhydrous magnesium perchlorate, these crystals suffered less than 0.1 percent loss in weight, When the procedure was repeated using the material obtained in Example IV, crystalline amicetin melting at 243–244 degrees centigrade was obtained.

*Example IX.—Preparation of the crystalline hydrochloride of amicetin*

Hydrated amicetin crystals, 1.88 grams, were dissolved in 100 milliliters of 0.05 N hydrochloric acid. The solution was filtered and freeze-dried. The dried powder was dissolved in ten milliliters of methanol, eight milliliters of water and two milliliters of 0.05 N hydrochloric acid. A total of 100 milliliters of acetone was added portionwise and white crystals separated. After cooling overnight in the refrigerator, the crystals were collected and recrystallized from the same solvent mixture to yield 1.77 grams of fine white crystals which melted at 190–192 degrees centigrade and assayed 900 *M. avium* units per milligram. On drying at 60 degrees centigrade over a desiccant in high vacuum, this preparation lost 13.8 percent of its weight.

The potency-toxicity ratio of amicetin appears to be highly favorable as compared with other antibiotics. When tested against the virulent human strain of the tubercle bacillus, *M. tuberculosis* H37Rv, amicetin is more active than either streptomycin or viomycin. In experimental animals, amicetin is reasonably free from toxic reactions. Daily doses of 400 milligrams per kilogram of body weight have been administered subcutaneously to mice over a period of fourteen days with no toxic reaction being observed.

Having thus described our invention we claim:

1. A substance effective in inhibiting the growth of Mycobacteria, selected from the group consisting of a weakly basic substance capable of forming salts with acid, that is sparingly soluble in water and methanol, melting at 243–244 degrees centigrade, containing the elements carbon, hydrogen, nitrogen and oxygen, whose ultraviolet absorption spectrum in fifty percent aqueous ethanol exhibits a single characteristic maximum at 306 millimicrons $$E_{1\,cm.}^{1\%} = 512$$

in fifty percent ethanol and fifty percent one-tenth normal sodium hydroxide solution exhibits two characteristic maxima at 272 millimicrons, $$E_{1\,cm.}^{1\%} = 283$$

and 325 millimicrons $$E_{1\,cm.}^{1\%} = 412$$

in fifty percent ethanol and fifty percent one-tenth normal hydrochloric acid solution exhibits a single characteristic maximum at 304 millimicrons $$E_{1\,cm.}^{1\%} = 451$$

a suspension of which in mineral oil exhibits characteristic absorption in the infrared region of the spectrum at the following frequencies expressed in reciprocal centimeters: 3405, 1684, 1654, 1614, 1567, 1522, 1491, 1252, 1176, 1104, 1072, 1046, 1019, 855, 790, 758, 692, whose hydrate is soluble in methanol and ethanol, melts at 160–170 degrees centigrade and has a rotation $[\alpha]_D^{23.5}$ in alcohol of plus 143 degrees, and the acid addition salts thereof.

2. A substance effective in inhibiting the growth of Mycobacteria, consisting of a weakly basic substance capable of forming salts with acid, that is sparingly soluble in water and methanol, melting at 243–244 degrees centigrade, containing the elements carbon, hydrogen, nitrogen and oxygen, whose ultraviolet absorption spectrum in fifty percent aqueous ethanol exhibits a single characteristic maximum at 306 millimicrons $$E_{1\,cm.}^{1\%} = 512$$

and in fifty percent ethanol and fifty percent one-tenth normal sodium hydroxide solution exhibits two characteristic maxima at 272 millimicrons $$E_{1\,cm.}^{1\%} = 283$$

and 325 millimicrons $$E_{1\,cm.}^{1\%} = 412$$

in fifty percent ethanol and fifty percent one-tenth normal hydrochloric acid solution exhibits a single characteristic maximum at 304 millimicrons $$E_{1\,cm.}^{1\%} = 451$$

a suspension of which in mineral oil exhibits characteristic absorption in the infrared region of the spectrum at the following frequencies expressed in reciprocal centimeters: 3405, 3289, 1684, 1654, 1614, 1567, 1522, 1491, 1252, 1176, 1104, 1072, 1046, 1019, 855, 790, 758, 692, whose hydrate is soluble in methanol and ethanol, melts at 160–170 degrees centigrade and has a rotation $[\alpha]_D^{23.5}$ in alcohol of plus 143 degrees.

3. An acid salt of the substance described in claim 2.

4. A hydrochloride of the substance described in claim 2.

5. A process for producing an amicetin fermentation broth comprising cultivating a strain of *Streptomyces vinaceus-drappus* in an aqueous nutrient-containing carbohydrate solution under submerged aerobic growth conditions at a temperature of from about twenty degrees centigrade to about thirty degrees centigrade for a period of from about two days to about five days.

6. A process for producing amicetin comprising cultivating a strain of *Streptomyces vinaceus-drappus* in an aqueous, nutrient-containing carbohydrate solution under submerged aerobic growth conditions at a temperature of from about twenty degrees centigrade to about thirty degrees centigrade for a period of from about two days to about five days and then recovering the so produced amicetin from the fermentation broth.

7. A process as set forth in claim 6 wherein the recovery of amicetin includes the steps of adsorbing the antibiotic by intimately contacting an aqueous solution thereof with activated carbon and eluting said antibiotic from said activated carbon with an acidified ten percent aqueous acetone solution.

8. A process for producing amicetin comprising cultivating a strain of *Streptomyces vinaceus-drappus* in an aqueous, nutrient-containing carbohydrate solution under submerged aerobic growth conditions between about twenty and about thirty degrees centigrade for a period between about two and five days and recovering the so-produced amicetin from the fermentation broth by extracting the antibiotic with a neutral organic solvent selected from the group consisting of water-immiscible liquid alcohols, ketones, and esters.

9. A process as claimed in claim 8 where the solvent is butanol.

10. A process for the preparation of an aqueous solution of amicetin comprising cultivating a strain of *Streptomyces vinaceus-drappus* in an aqueous, nutrient-containing, carbohydrate solution under aerobic conditions at a temperature between about twenty and about thirty degrees centigrade until substantial anti-mycobacterial activity as determined by the *M. avium* plate assay is imparted to said solution and a substantial growth of the mycelium of *Streptomyces vinaceus-drappus* is obtained and then separating the mycelium from the antibiotic containing aqueous solution at the pH normally resulting at the end of the cultivation period.

11. A process for producing amicetin comprising cultivating a strain of *Streptomyces vinaceus-drappus* in an aqueous, nutrient-containing carbohydrate solution under submerged aerobic growth conditions between about twenty and about thirty degrees centigrade for a period between about two and about five days, recovering the so-produced amicetin from the resulting fermentation broth by extracting the antibiotic with a neutral organic solvent selected from the group consisting of water-immiscible alcohols, ketones, and esters, concentrating the resulting extract to a small fraction of its original volume, treating the concentrated solution thus-obtained with a dilute acid, separating the dilute acid phase, adjusting said dilute acid phase to a pH between about 7 and about 9 with an alkali and then recovering solid amicetin from the solution.

12. The process of claim 11 wherein the neutral water immiscible solvent is butanol.

13. A process for producing amicetin comprising cultivating a strain of Streptomyces vinaceus-drappus in an aqueous, nutrient-containing carbohydrate solution under submerged aerobic growth conditions between about twenty and about thirty degrees centigrade for a period between about two and about five days followed by recovery of the thus-produced amicetin from the fermentation broth by extracting the antibiotic at a pH between about 7 and about 8 with a neutral organic solvent selected from the group consisting of water-immiscible alcohols, ketones, and esters, co-distilling the solvent and water from the extract while adding water as necessary to maintain the solvent in an aqueous solution and crystallizing the desired amicetin from the aqueous organic residue.

14. The process of claim 13 wherein the organic solvent is butanol.

15. A substance effective for inhibiting the growth of Mycobacteria selected from the group consisting of a weakly basic substance capable of forming a salt with an acid, which in its pure crystalline form is characterized by being sparingly soluble in water and methanol, melting at 243-244 degrees centigrade, and containing the elements carbon, hydrogen, nitrogen, and oxygen, by an ultraviolet absorption spectrum which in fifty percent aqueous ethanol solution exhibits a single characteristic maximum at 306 millimicrons $$E_{1cm.}^{1\%} = 514 \pm 2$$

in fifty percent ethanol and fifty percent one-tenth normal sodium hydroxide solution exhibits a strong absorption band at 272 millimicrons and at 325 millimicrons, and in fifty percent ethanol and fifty percent one-tenth normal hydrochloric acid solution exhibits a single maximum at 304 millimicrons $$E_{1cm.}^{1\%} = 447 \pm 4$$

by an infrared absorption spectrum in a suspension in mineral oil which exhibits characteristic absorption in the infrared region at the following frequencies expressed in reciprocal centimeters: 3405, 1684, 1654, 1614, 1567, 1522, 1491, 1252, 1176, 1104, 1072, 1046, 1019, 855, 790, 758, 692; and by a hydrate which is soluble in methanol and ethanol melts at 160–170 degrees centigrade, and has a rotation $[\alpha]_D^{23.5}$ in alcohol of plus 143 degrees; the hydrate of the basic substance; and the acid addition salts of the basic substance.

References Cited in the file of this patent

UNITED STATES PATENTS

| | | |
|---|---|---|
| 2,516,080 | Sobin | July 18, 1950 |
| 2,586,762 | Finlay et al. | Feb. 19, 1952 |
| 2,602,767 | Walton et al. | July 8, 1952 |

FOREIGN PATENTS

| | | |
|---|---|---|
| 707,332 | Great Britain | Apr. 14, 1954 |
| 708,686 | Great Britain | May 15, 1954 |

OTHER REFERENCES

Johnson et al.: "Mycomycin," Jour. Bact. 54 (1947), p. 281.

Waksman et al.: Science, March 25, 1949, vol. 109, No. 2830, pp. 305–307.

Robertson et al.: Antibiotics, Lippincott, Phila., 1949, p. 119.

Science News Letter for March 1951, p. 130.